(12) United States Patent
Li et al.

(10) Patent No.: US 10,078,964 B2
(45) Date of Patent: Sep. 18, 2018

(54) REMOTE DRIVING ASSISTANCE

(71) Applicant: EMPIRE TECHNOLOGY DEVELOPMENT LLC, Wilmington, DE (US)

(72) Inventors: Daqi Li, Xi'an Shaanxi (CN); Jun Fang, Xi'an Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/589,019

(22) Filed: May 8, 2017

(65) Prior Publication Data

US 2017/0243484 A1 Aug. 24, 2017

Related U.S. Application Data

(63) Continuation of application No. 14/440,239, filed as application No. PCT/CN2014/078774 on May 29, 2014, now Pat. No. 9,668,108.

(51) Int. Cl.
| | |
|---|---|
| G08G 1/09 | (2006.01) |
| H04L 9/32 | (2006.01) |
| H04W 4/02 | (2018.01) |
| G08G 1/052 | (2006.01) |
| G08G 1/01 | (2006.01) |

(Continued)

(52) U.S. Cl.
CPC ..... *G08G 1/096725* (2013.01); *G05D 1/0297* (2013.01); *G08G 1/0133* (2013.01); *G08G 1/0145* (2013.01); *G08G 1/052* (2013.01); *G08G 1/20* (2013.01); *H04L 9/14* (2013.01); *H04L 9/30* (2013.01); *H04L 9/32* (2013.01);

(Continued)

(58) Field of Classification Search
CPC ....... H04W 4/046; H04W 4/025; H04W 4/06; G08G 1/096716; G08G 1/096741; G08G 1/06775; G08G 1/096783; H04B 1/3822
See application file for complete search history.

(56) References Cited

U.S. PATENT DOCUMENTS 6,789,193 B1 * 9/2004 Heiden .................. G06F 21/33
705/76
6,842,628 B1 1/2005 Arnold et al.
(Continued)

FOREIGN PATENT DOCUMENTS

| CN | 102254438 A | 11/2011 |
| JP | 2013242664 A | 12/2013 |
| WO | 2013060530 A1 | 5/2013 |

OTHER PUBLICATIONS

"Audi at CES 2012: Driver assistance systems," accessed at http://www.audiusa.com/newsroom/news/press-releases/2012/01/driver-assistance-systems, posted on Jan. 10, 2012, pp. 7.
(Continued)

*Primary Examiner* — Muthuswamy Manoharan

(57) ABSTRACT

In at least some examples, a control center, which provides remote driving assistance service, may be configured to receive traffic data from sensors and to identify an area of congested traffic, based on the received traffic data, within a predetermined range of the sensors. When the control center receives a request for the remote driving assistance service, from a vehicle within the predetermined range of the sensor, the control center may generate and transmit remote driving commands to the vehicle.

20 Claims, 6 Drawing Sheets

(51) Int. Cl.
  G08G 1/00      (2006.01)
  H04L 9/30      (2006.01)
  H04L 9/14      (2006.01)
  G08G 1/0967    (2006.01)
  H04W 4/04      (2009.01)
  G05D 1/02      (2006.01)
  H04L 29/06     (2006.01)
  G08G 1/02      (2006.01)

(52) U.S. Cl.
  CPC ......... H04L 63/0428 (2013.01); H04W 4/027 (2013.01); H04W 4/046 (2013.01)

(56) References Cited

U.S. PATENT DOCUMENTS

| | | | |
|---|---|---|---|
| 8,229,644 B2 | 7/2012 | Boecker et al. | |
| 8,849,494 B1* | 9/2014 | Herbach | B60W 30/00 |
| | | | 701/24 |
| 9,560,061 B2* | 1/2017 | Wilding | H04L 63/0245 |
| 2004/0073356 A1 | 4/2004 | Craine | |
| 2009/0209233 A1 | 8/2009 | Morrison | |
| 2010/0232605 A1 | 9/2010 | Kim | |
| 2012/0277947 A1 | 11/2012 | Boehringer et al. | |
| 2012/0323690 A1* | 12/2012 | Michael | G06Q 30/02 |
| | | | 705/14.58 |
| 2014/0207535 A1 | 7/2014 | Stefan et al. | |
| 2015/0073685 A1 | 3/2015 | Choi et al. | |
| 2016/0006752 A1* | 1/2016 | Wilding | H04L 63/0245 |
| | | | 701/26 |

OTHER PUBLICATIONS

"Autonomous car," accessed at https://web.archive.org/web/20140511115740/http://en.wikipedia.org/wiki/Autonomous_car, last modified on May 11, 2014, pp. 23.

"Google driverless car," accessed at https://web.archive.org/web/20140525202237/http://en.wikipedia.org/wiki/Google_driverless_car, last modified on May 23, 2014, pp. 7.

"Intelligent transportation system," accessed at http://web.archive.org/web/20140402023054/hftp://en.wikipedia.org/wiki/Intelligent_transportation_system, last modified on Mar. 31, 2014, pp. 7.

Bullis, K., "How Vehicle Automation Will Cut Fuel Consumption," accessed at http://www.technologyreview.com/news/425850/how-vehicle-automation-will-cut-fuel-consumption/, posted on Oct. 24, 2011, pp. 1-2.

Hudson, P., "The car that automatically navigates traffic jams," accessed at https://web.archive.org/web/20121014211521/http://www.telegraph.co.uk/motoring/road-safety/9356164/The-car-that-automatically-navigates-taffic-jams.html, posted on Jun. 26, 2012, pp. 2.

Iftekhar, L., "Safety-Aware Intelligent Transportation Systems: Cooperative Autonomous Driving for Vehicular Networks," A Thesis: Thayer School of Engineering Dartmouth College, pp. 1-106 (Jun. 2012).

International Search Report and Written Opinion for International Application No. PCT/CN2014/078774 dated Feb. 17, 2015, pp. 7.

* cited by examiner

REMOTE DRIVING ASSISTANCE

CROSS-REFERENCE TO RELATED APPLICATIONS

The present application is a continuation application under 35 U.S.C. § 120 of U.S. patent application Ser. No. 14/440,239, filed on May 1, 2015, now U.S. Pat. No. 9,668,108, which is a U.S. National Stage filing under 35 U.S.C. § 371 of International Application No. PCT/CN2014/078774, filed on May 29, 2014 and entitled "REMOTE DRIVING ASSISTANCE." U.S. patent application Ser. No. 14/440,239 and International Application No. PCT/CN2014/078774, including any appendices or attachments thereof, are incorporated by reference herein in their entireties.

TECHNICAL FIELD

The technologies described herein pertain generally to remote driving assistance for vehicles.

BACKGROUND

Unless otherwise indicated herein, the approaches described in this section are not prior art to the claims in this application and are not admitted to be prior art by inclusion in this section.

While driving a vehicle, a driver may seek driving assistance service for various reasons such as fatigue, health emergency, impatience, etc. In some examples, the driving assistance service may be implemented by a processing unit integrated with the vehicle based on information collected by one or more sensors coupled to the vehicle. The sensors may include image sensors, distance sensors, gyro meters, etc.

SUMMARY

Technologies are generally described for a remote driving assistance system. The various techniques described herein may be implemented in various systems, methods, computer-programmable products, and computer-readable medium.

In some examples, various embodiments may be implemented as systems. Some systems may include, at least, a traffic receiver configured to receive traffic data from a sensor; a traffic evaluator configured to identify an area of congested traffic, based on the received traffic data, within a predetermined range of the sensor; a service transmitter configured to announce availability of a remote driving assistance service to at least some vehicles within the predetermined range of the sensor; a request receiver configured to receive a request for the remote driving assistance service from a requesting one of the vehicles; and a remote driving assistance manager configured to transmit remote driving commands to the requesting vehicle at least within the area of congested traffic.

Some other systems may include, at least, a real time traffic tracker configured to identify an area of congested traffic by monitoring real time traffic information; a positioning device configured to monitor location information of a vehicle having a subscription to a remote driving assistance service; a request receiver configured to receive, from the vehicle, a request for the remote driving assistance service; and a remote driving assistance manager configured to transmit remote driving commands to the vehicle when the vehicle is within the area of congested traffic.

In some examples, various embodiments may be implemented as methods. Some methods may include, at least, receiving traffic data from a sensor; identifying an area of congested traffic, based on the received traffic data, within a predetermined range of the sensor; receiving, from a vehicle within the predetermined range of the sensor, a request for remote driving assistance service; and transmitting remote driving commands to the vehicle at least within the predetermined range of the sensor.

In some examples, various embodiments may be implemented as computer-readable mediums having executable instructions stored thereon. Some computer-readable mediums may store instructions that, when executed, cause one or more processors to perform operations comprising receiving traffic data from a sensor; identifying an area of congested traffic, based on the received traffic data, within a predetermined range of the sensor; broadcasting an announcement regarding availability of a remote driving assistance service to at least some vehicles within the predetermined range of the sensor; receiving, from one of the vehicles within the predetermined range of the sensor, a request for the remote driving assistance service; and transmitting remote driving commands to the vehicle at least within the predetermined range of the sensor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings, in which:

DETAILED DESCRIPTION

Figure 1:
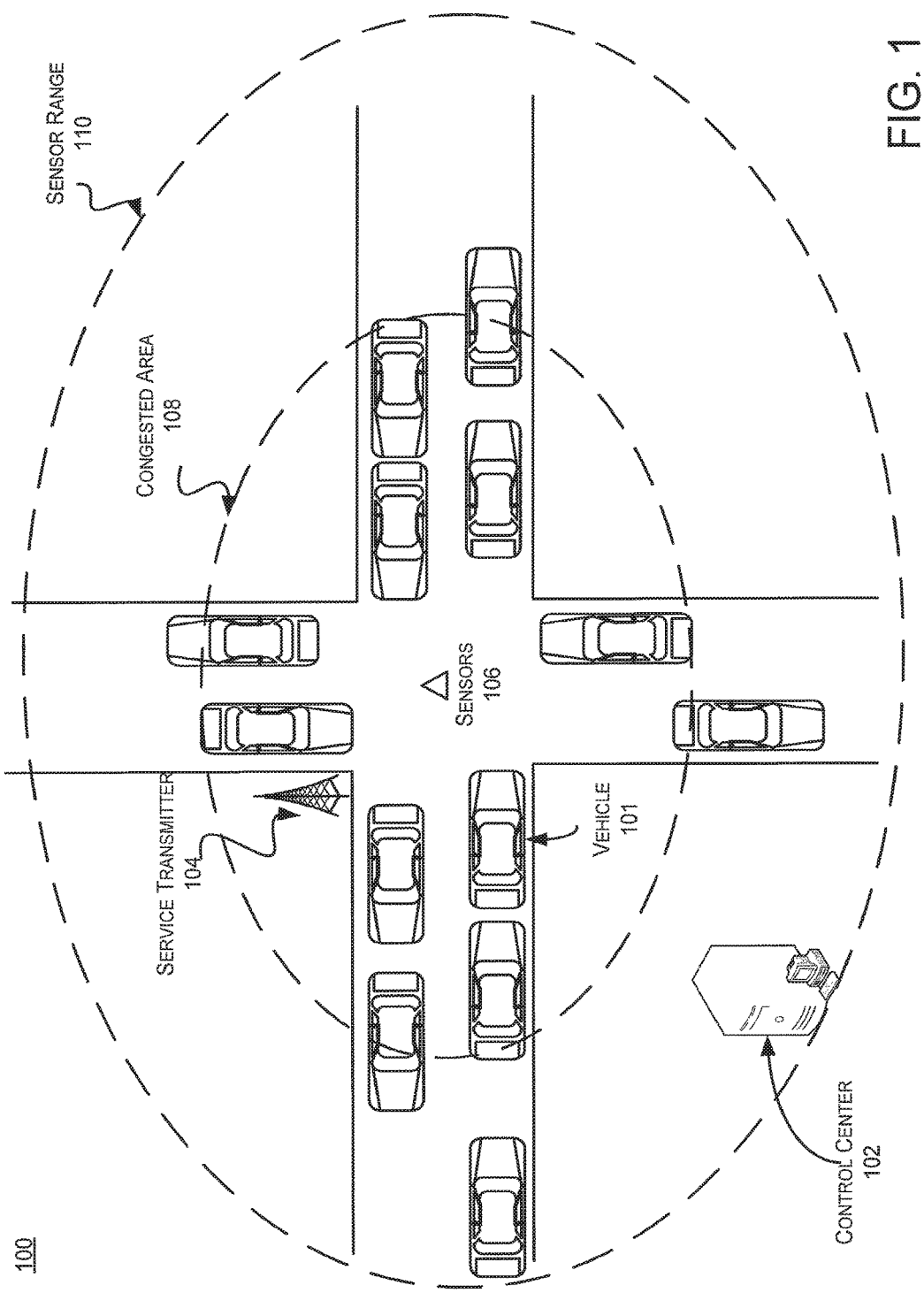
FIG. 1 shows a high-level diagram of an example scenario in which a remote driving assistance service system provides services to a vehicle.

In the following detailed description, references are made to the accompanying drawings, which form a part of the description. In the drawings, similar symbols typically identify similar components, unless context dictates otherwise.

Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Briefly stated, when driving conditions such as, by way of example, traffic conditions, weather conditions, road construction, etc., dictate or create a need for a vehicle to proceed at a speed that is below a safe or legal speed limit, a remote driving assistance service may control the vehicle by providing remote driving assistance. The remote driving assistance may be provided upon request from a driver of the vehicle or from an application running on the vehicle. Alternatively, the remote driving assistance may be offered to the driver or to the vehicle itself, as part of a subscription-based service. As referenced herein, a driver may refer to a person driving the vehicle that may be receiving remote driving assistance; however, some embodiments may contemplate on an autonomous vehicle, in which a processor enabled application controls the vehicle.

When initiated, the remote driving assistance service may assume control of the vehicle, in place of the driver, and control the vehicle until it determines that driving conditions are favorable for the driver to resume control of the vehicle. For example, the remote driving assistance service may determine that the driving conditions have improved to a point where the vehicle may proceed at a safe or legal speed limit, at which time the remote driving assistance service may request that the driver resume control of the vehicle. Subsequently, the driver may take over control of the vehicle in response to the request by the remote driving assistance service.

FIG. 1 shows a high-level diagram of an example scenario in which a remote driving assistance service system 100 provides services to a vehicle, arranged in accordance with at least some embodiments described herein. As depicted, system 100 may be providing its services to one or more vehicles 101, and may include, at least, a control center 102, a service transmitter 104, and one or more sensors 106. The example scenario may include a congested area 108 that may refer to an area in which traffic is identified or deemed to be congested by control center 102, and a sensor range 110 that may refer to an area of coverage of sensors 106. Non-limiting examples of sensors 106 may include thermal sensors, pressure sensors, motion sensors, etc. Further to such examples, the sensor range of thermal and motion sensors may include radial distances extending from a respective sensor in which objects, including but not limited to vehicles, may be distinguished and tracked based on thermal imaging and motion detection, respectively; and the sensor range of pressure sensors may include a length of pavement under which sensors are at least sporadically laid to detect and track the presence and movement of vehicles based on detected weight fluctuations on the pavement.

Vehicles 101 may refer to any type of vehicle that may be operated by a driver. Non-limiting types or examples of such vehicles may include automobiles, autonomous vehicles, trucks, vans, golf carts, etc. In at least some examples, vehicles 101 may include sensors, processors, storage devices, and/or transceivers installed thereon. Non-limiting examples of the sensors on vehicles 101 may include image sensors, distance sensors or detectors, photodetectors, gyro meters, positioning devices, etc. The sensors may collect environmental information including distances between vehicles 101 and one or more surrounding objects, e.g., other vehicles; current speeds of vehicle 101; ambient brightness; positions of vehicles 101; traffic signals; road conditions; etc. The environmental information may be temporarily stored in the storage devices of vehicles 101 and/or periodically transmitted, by the transceivers, to control center 102. Unless context requires specific reference, the following description may make representative reference to "vehicle 101" or collective reference to "one or more vehicles 101" or "vehicles 101."

In at least some examples, the remote driving assistance service may be provided as a subscription-based service. A subscription to the remote driving assistance service may correspond to the vehicle and/or to the driver. In the case where the subscription is provided or applies to a vehicle, regardless of the identity of the driver, vehicle 101 may receive the remote driving assistance service under the appropriate driving conditions. As an example, when driving conditions are appropriate for remote driving assistance in an area in which the vehicle has been detected, the driver of the vehicle may receive an indication that remote driving services are available. Alternatively, a person, e.g., driver, may subscribe to the remote driving assistance service so that any vehicle that the driver is driving may receive the remote driving assistance service, assuming the vehicle has the appropriate technology. As an example, the driver may enter identification information upon entering the vehicle using various technologies such as password entry on a dashboard user interface, biometric verification, keycard scanner, etc. The entered identification information may identify the driver as one eligible to receive remote driving assistance, and therefore when driving conditions are appropriate for remote driving assistance in an area in which the vehicle has been detected, the driver of the vehicle may receive an indication that remote driving services are available.

In some examples, the remote driving assistance service may be provided for free as a municipal service provided by a government agency, e.g., Department of Transportation, to vehicles having the appropriate technology to receive the remote driving assistance.

Responsive to receiving the requested remote driving commands from control center 102, the processors included on vehicle 101 may execute the received commands to control components of vehicle 101, e.g., accelerator, brakes, steering wheel, headlights, etc. In at least some examples, the processors may be configured to control the components of vehicle 101 in accordance with known technologies for automatically operating a vehicle in an autonomous driving mode requiring no user action.

Control center 102 may refer to a computing device served and/or operated by a remote driving assistance service provider. Non-limiting examples of remote driving assistance service providers may be the aforementioned municipal service or a subscription-based service. Regardless of whether the remote driving assistance service provider is a municipal service or a subscription-based service, control center 102 may be communicatively coupled to service transmitter 104 and/or sensors 106. Control center 102 may be configured to receive information collected by sensors 106 and to identify, within sensor range 110, congested traffic area 108 based on the received information.

For example, sensors 106 may include one or more thermal sensors to detect heat emanating from objects or persons within a sensor range 110. In examples in which sensors 106 include one or more thermal sensors, control center 102 may receive, from sensors 106, one or more thermal images depicting traffic conditions within sensor range 110. Control center 102 may identify and count vehicles in the one or more thermal images. When the number of vehicles in at least one of the thermal images exceeds a predetermined value, control center 102 may deem traffic within sensor range 110 to be congested for the purpose of providing remote driving assistance, as will be explained further below.

In another example, sensors 106 may include one or more pressure sensors that may be buried under one or more portions of a road or street to detect the presence or absence of vehicles at different locations of the road or street based on changes in weight on the portion of the road or street. A count of the vehicles may be calculated based on the presence of the vehicles based on the weight information collected by the pressure sensors. When weight information collected by sensor 106 indicates the number of vehicles within a portion of sensor range 110 exceeds the predetermined value, control center 102 may deem traffic within sensor range 110 to be congested for the purposes of providing remote driving assistance. As an example, sensors 106 may determine a cumulative weight for a predetermined span of a road or street, e.g., 50 meters, for a predetermined period of time, e.g., 30 seconds, and transmit the cumulative weight value to control center 102. Control center 102 may then estimate a number of vehicles within the predetermined span of the road or street by dividing the received cumulative weight value by an average vehicle weight, and identify or deem traffic to be congested when the estimated number of vehicles meets or exceeds a predetermined threshold value. Alternatively, sensors 106 may count a number of vehicles passing over the predetermined span of the road or street over the predetermined period of time by counting a number of fluctuations in weight on the predetermined span of the road or street that are indicative of vehicles passing over, and transmit the count value to control center 102. Control center 102 may then deem traffic to be congested when the counted number of vehicles meets or exceeds a predetermined threshold value.

In yet another example, control center 102 may determine the traffic to be congested based on an average speed of a sampling of vehicles within sensor range 110 over a predetermined amount of time. Sensors 106 may include one or more motion sensors that may be strategically positioned to detect the respective speeds of the sampled vehicles within sensor range 110. The motion sensors may then transmit the detected speeds to control center 102. When the average detected speed of the sampled vehicles is less than a predetermined speed, e.g., 5 km/h, control center 102 may identify or deem traffic within sensor range 110 to be congested for the purposes of providing remote driving assistance.

When control center 102 identifies or deems at least a portion of the area within sensor range 110 to be congested area 108, control center 102 may generate an announcement regarding availability of the remote driving assistance. The announcement may be transmitted to one or more vehicles 101 within congested area 108 in accordance with one or more embodiments.

In at least some example embodiments, the announcement may be transmitted to one or more of vehicles 101 within sensor range 110, via service transmitter 104, as an open offer of the remote driving assistance service.

In some other example embodiments, one or more of vehicles 101 within sensor range 110 may have a subscription to a remote driving assistance service. In such examples, control center 102 may encrypt the announcement so that only subscribing vehicles, with a decrypting receiver, may receive and respond to the announcement. Alternatively, also for a subscription-based driving assistance service, control center 102 may broadcast, via service transmitter 104, the announcement on a predetermined wireless channel that may be received by one or more transceivers integrated on the subscribing vehicles.

Regardless of the embodiment by which the announcement regarding availability of remote driving assistance services is provided to one or more vehicles 101, in the one or more vehicles 101 to which the announcement is transmitted, the announcement may be displayed on a dashboard display component, a heads-up display component, etc., or announced audibly via a dashboard audio receiver, via a client device that receives audio signals from a dashboard component via a Bluetooth connection, etc.

Subsequent to the announcement, one or more of vehicles 101 and control center 102 may engage in a security protocol to prevent unauthorized devices from posing as control center 102. As a non-limiting example, a vehicle 101 may transmit a request for control center 102 to verify its identity to the vehicle 101. The verification request may include a message and a copy of the message. The copy of the message is encrypted with a private key while control center 102 stores a public key. The message may include a request for remote driving assistance, may be an identifier, or may even be a "dummy" message that includes random alphanumeric characters. Regardless of the content of the message, control center 102 may decrypt the copy of the message from a respective one of vehicles 101 with the public key. Control center 102 may then compare the decrypted copy of the message to the message included in the verification request. The result of the comparison may be transmitted back to the vehicle 101 as confirmation that control center 102 is authorized to control the vehicle 101.

Alternative embodiments of remote driving assistance may contemplate the foregoing security protocol between a respective one of vehicles 101 and control center 102 being executed regardless of traffic conditions. That is, when a respective one of vehicles 101 is within sensor range 110, control center 102 may initiate the aforementioned security protocol to verify its identity to the vehicle 101, which will be further described below with regard to FIG. 5.

Upon a determination that the identity of control center 102 has been verified to the one or more vehicles 101 and, thus, control center 102, is authorized to control the vehicle 101, control center 102 may receive a request for the remote driving assistance service from the vehicle 101. In response to the request, control center 102 may generate the remote driving commands for the respective vehicle 101 in accordance with the previously collected environmental information, and further, transmit the remote driving commands to the vehicle 101. For example, when the distance sensors on the vehicle 101 indicate that a distance between vehicle 101 and another vehicle in front of the vehicle 101 is less than a predetermined threshold value set as a safe following distance, control center 102 may remotely transmit a driving command to the respective vehicle 101 so that the processors on the vehicle 101 apply the brake to reduce the speed of the vehicle 101.

Further, control center 102 may track movement of the respective vehicle 101 relative to congested area 108 based on the position of vehicle 101 determined by the positioning devices on vehicle 101, using, e.g., Global Positioning System (GPS) technologies. Based on the relative location of vehicle 101, control center 102 may determine to cease transmitting the remote driving commands until driving conditions improve to a point where the vehicle may proceed at a safe or legal speed limit, at which time the remote driving assistance service requests that the driver resume control of the vehicle. That is, when vehicle 101 is determined to be outside of congested area 108 or when a detected speed of vehicle 101 exceeds the predetermined threshold value that is indicative of congested traffic conditions, control center 102 may transmit instructions for the driver to resume control of vehicle 101. In at least one example, control center 102 may transmit remote driving commands to guide vehicle 101 to a safe location, e.g., pull over on the road shoulder, if the driver has not resumed control of vehicle 101 as instructed. When the sensors on vehicle 101 indicate that the driver has resumed control of vehicle 101, the remote driving assistance service may be terminated by control center 102.

Service transmitter 104 may refer to a wireless signal transmitter that may be configured to transmit wireless signals between vehicles 101 and control center 102. The wireless signals may carry the remote driving commands and/or the announcement of the availability of the remote driving assistance service from control center 102 to one or more of vehicles 101 within sensor range 110. In at least some examples, service transmitter 104 may be implemented as a radio tower with limited coverage. Accordingly, service transmitter 104 may transmit the wireless signals to one or more of vehicles 101 at least within a range approximately close to sensor range 110.

Sensors 106 may refer to one or more sensors that may be configured to collect traffic and environmental information at predetermined locations, e.g., streets, roads, highways, traffic intersections, parking garages, etc. The collected information may serve a basis for the identification of one or more congested areas 108, for the purpose of providing remote driving assistance to one or more of vehicles 101. As previously described, non-limiting examples of sensors 106 may include image sensors, motion sensors, thermal image sensors, pressure sensors, etc. In at least some examples, the image sensors, motion sensors, and thermal image sensors may be mounted with traffic lights. The pressure sensors may be buried underground to detect the weights of the vehicles above ground.

Congested area 108 may refer to an area in which traffic is identified or deemed to be congested by control center 102 based on the information collected by sensors 106. Congested area 108 is illustrated in FIG. 1 and described hereafter as an example of an area in which a predetermined number of vehicles 101 are detected to be traveling at a low speed over a predetermined amount of time. One skilled in the art will appreciate there will be other types of areas where vehicles travel at a low speed due to speed limitation or other factors, e.g., weather conditions, road construction, etc.

Sensor range 110 may refer to an area determined by the sensibility of sensors 106. Within sensor range 110, sensors 106 may sense the existence of vehicles. In at least some examples, sensor range 110 may encompass congested area 108.

Figure 2:
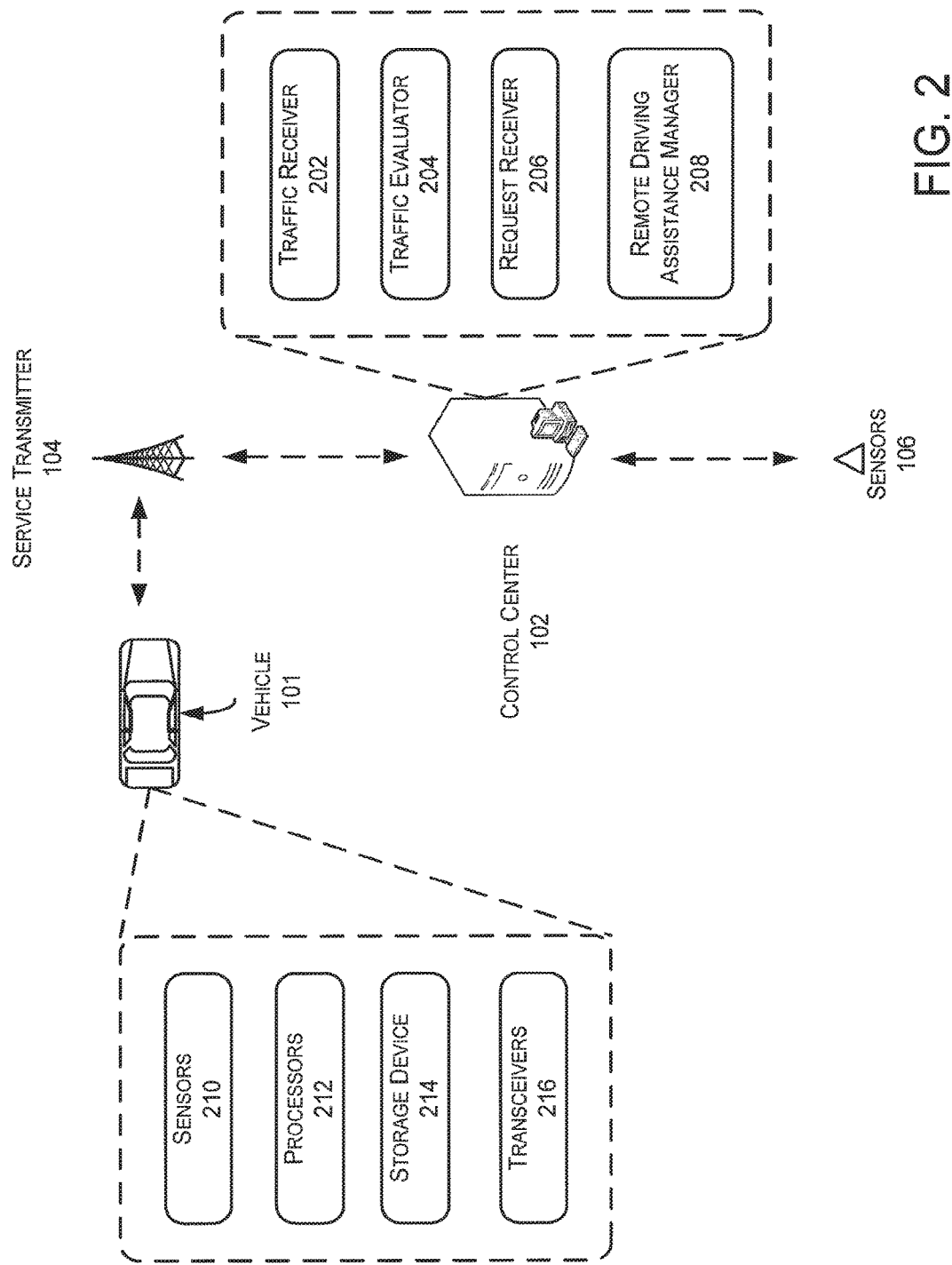
FIG. 2 shows an example vehicle and an example control center by which various aspects of remote driving assistance may be implemented.

FIG. 2 shows an example vehicle 101 and an example control center 102, as shown in and described with regard to FIG. 1, by which various aspects of remote driving assistance may be implemented, arranged in accordance with at least some embodiments described herein. As depicted, control center 102 may include, at least, a traffic receiver 202, a traffic evaluator 204, a request receiver 206, and a remote driving assistance manager 208; vehicle 101 may include one or more sensors 210, one or more processors 212, one or more storage devices 214, and one or more transceivers 216.

As described herein, control center 102 may refer to the computing device communicatively coupled to service transmitter 104 and/or sensors 106.

Traffic receiver 202 may refer to a component that may be configured to receive traffic data and environmental data from sensors 106. The traffic data may include information, collected by sensors 106, regarding traffic conditions within a predetermined location, e.g., intersections of roads, parking garage, etc. Non-limiting examples of the information collected by sensors 106 and received by traffic receiver 202 may include thermal images, picture images, speed, weights, etc. Non-limiting examples of environmental data collected by sensors 106 and received by traffic receiver 202 may include distances between one or more of vehicles 101 relative to other vehicles or objects, a speed of a respective one of vehicles 101, ambient brightness, traffic signals, road conditions, current weather conditions, etc. Traffic receiver 202 may transmit the received data to traffic evaluator 204 as a basis for identifying congested traffic. In accordance with various embodiments, traffic receiver 202 may be implemented as hardware, software, firmware, or any combination thereof.

Traffic receiver 202 may be further configured to continually receive traffic data and environmental data from sensors 106 to continually evaluate traffic conditions while remote driving assistance is being provided. Thus, when traffic conditions, described below, fall below threshold values indicative of congested traffic, a driver of a vehicle 101 receiving remote driving assistance may be so warned and remote driving assistance may be terminated.

Traffic evaluator 204 may refer to a component that may be configured to identify congested traffic based on at least the traffic data received from traffic receiver 202. Traffic evaluator 204 may be further configured to periodically receive updates from traffic receiver 202 to facilitate continuous evaluations of traffic conditions while remote driving assistance is being provided.

In at least one example, based on thermal images collected by sensors 106, traffic evaluator 204 may recognize vehicles on the thermal images and count the number of vehicles that appear in the thermal images within a predetermined span or length of a road or street, at an intersection, e.g., within 50 meters in every radial direction from a traffic light, etc. When the number of counted vehicles exceeds a predetermined value number of vehicles deemed to indicate congested traffic, traffic evaluator 204 may deem or identify traffic to be congested within at least a portion of sensor range 110.

In another example, when the weight information received via traffic receiver 202 indicates the number of vehicles within a portion of sensor range 110 exceeds the predetermined value indicative of congested traffic, etc., traffic evaluator 204 may deem or identify traffic to be congested within at least a portion of sensor range 110. In at least some examples, the number of vehicles may be determined based on a cumulative weight of vehicles within the predetermined span or length of a road or street. The cumulative weight may be calculated based on the data collected by one or more pressure sensors that may be buried under one or more portions of the road or street to detect the presence or absence of vehicles at different location of the road or street.

In yet another example, when the detected speed of a predetermined number of vehicles 101 within sensor range 110 are less than a predetermined threshold speed value, e.g., 5 km/h, over a predetermined amount of time, e.g., 5 minutes, traffic evaluator 204 may identify or deem traffic to be congested within sensor range 110. In accordance with various embodiments, traffic evaluator 204 may be implemented as hardware, software, firmware, or any combination thereof.

Request receiver 206 may refer to a component that may be configured to execute a security protocol with at least one of vehicles 101. Request receiver 206 may receive, from one or more of vehicles 101, a verification request to verify the identity of control center 102 and/or a request for the remote driving assistance service. Request receiver 206 may be configured to receive the verification request and/or the request for remote driving assistance via one or more wireless communication links. The wireless communication links may implement one or more communication protocols corresponding to various mobile communications technologies, e.g., GSM (Global System for Mobile Communications), CDMA (Code Division Multiple Access), etc., depending upon the technologies supported by particular wireless service providers for the respective vehicles 101. The one or more communication links may be implemented utilizing non-cellular technologies such as conventional analog AM or FM radio, Wi-Fi™, wireless local area network (WLAN or IEEE 802.11), WiMAX™ (Worldwide Interoperability for Microwave Access), Bluetooth™, hardwired connections, e.g., cable, phone lines, and other analog and digital wireless voice and data transmission technologies. In at least some examples, since the request for the remote driving assistance service may be encrypted by the processors on a respective one of vehicles 101, request receiver 206 may decrypt the request prior to transmitting the request to remote driving assistance manager 208. In accordance with various embodiments, request receiver 206 may be implemented as hardware, software, firmware, or any combination thereof.

Remote driving assistance manager 208 may refer to a component that may be configured to generate remote driving commands and transmit the remote driving commands to vehicle 101. That is, in response to the request for the remote driving assistance service from traffic receiver 202 and traffic conditions from traffic evaluator 204, remote driving assistance manager 208 may generate the requested remote driving commands. That is, requested remote driving commands may be generated in accordance with the environmental information collected by sensors 210 integrated with vehicle 101, road conditions, traffic signals, current weather conditions, etc. For example, when the distance sensors on vehicle 101 detect that a distance between vehicle 101 and another vehicle in front of vehicle 101 is less than a predetermined value and signals indicating such detection are transmitted to control center 102, remote driving assistance manager 208 may generate a command for vehicle 101 to apply brakes. Remote driving assistance manager 208 may further transmit the command to apply brakes to vehicle 101 so that processors 212 on vehicle 101 may apply the brakes or otherwise act to reduce the speed of vehicle 101 to a predetermined speed. In another example when the sensors on vehicle 101 detect icy or other dangerous road conditions and signals indicating such detection are transmitted to control center 102, remote driving assistance manager 208 may generate a similar command for vehicle 101 to decelerate. Remote driving assistance manager 208 may transmit the command to decelerate to vehicle 101 so that processors 212 on vehicle 101 may control vehicle 101 to drive at a slower speed, e.g., 10 km/h that is appropriate for such road conditions. In yet another example, when an image sensor on vehicle 101 detects a red light and signals indicating such detection are transmitted to control center 102, remote driving assistance manager 208 may generate a "stop" command so that processors 212 on vehicle 101 may control vehicle 101 to fully stop in front of the red light.

Additionally, remote driving assistance manager 208 may determine a location of a respective one of vehicles 101 relative to congested area 108 based on, at least, the position information collected by the positioning device on vehicle 101. Based on at least the determined relative location of vehicle 101, remote driving assistance manager 208 may further determine whether vehicle 101 is not yet within, or has moved beyond, boundaries of congested area 108. Remote driving assistance manager 208 may cease transmitting the remote driving commands when vehicle 101 is determined to have moved beyond boundaries of congested area 108. In some examples, remote driving assistance manager 208 may transmit commands to remotely guide vehicle 101 to safe location, e.g., pull over on the road shoulder, and transmit instructions to the driver of vehicle 101. When sensors 210 on vehicle 101 indicate that the driver starts to control vehicle 101 and signals indicating such detection are transmitted to control center 102, remote driving assistance service may be terminated by remote driving assistance manager 208. In accordance with various embodiments, remote driving assistance manager 208 may be implemented as hardware, software, firmware, or any combination thereof.

Sensors 210 may refer to one or more sensors that may be configured to collect environmental information of vehicle 101. The environmental information may include including distances between vehicle 101 and one or more surrounding objects, e.g., other vehicles; a speed of vehicle 101; ambient brightness; a position of vehicle 101; traffic signals; road conditions; etc. The environmental information may be temporarily stored in the storage device of vehicle 101 and/or periodically transmitted, by the transceivers, to control center 102. Non-limiting examples of sensor 210 may include image sensors, distance sensors or detectors, photodetectors, gyro meters, positioning devices, etc.

Processors 212 may refer to one or more general purpose computer processors that may be configured to process the information collected from sensors 210 and/or to execute remote driving commands to control components of vehicle 101, e.g., accelerator, brakes, steering wheel, headlights, etc. In some examples, processors 212 may be further configured to encrypt a message as a basis for verifying the identity of control center 102.

Storage device 214 may refer to one or more memory devices configured to store information related to the remote driving assistance. The information may include the remote driving commands received from control center 102, the environmental information collected by sensors 210, the result of the verification of the identity of control center 102, etc.

Transceivers 216 may refer to one or more devices that may be configure to receive information from control center 102 and transmit information to control center 102. Non-limiting examples of transceivers 216 may include a radio frequency transceiver, a Medium Attachment Unit (MAU), etc.

Figure 3:
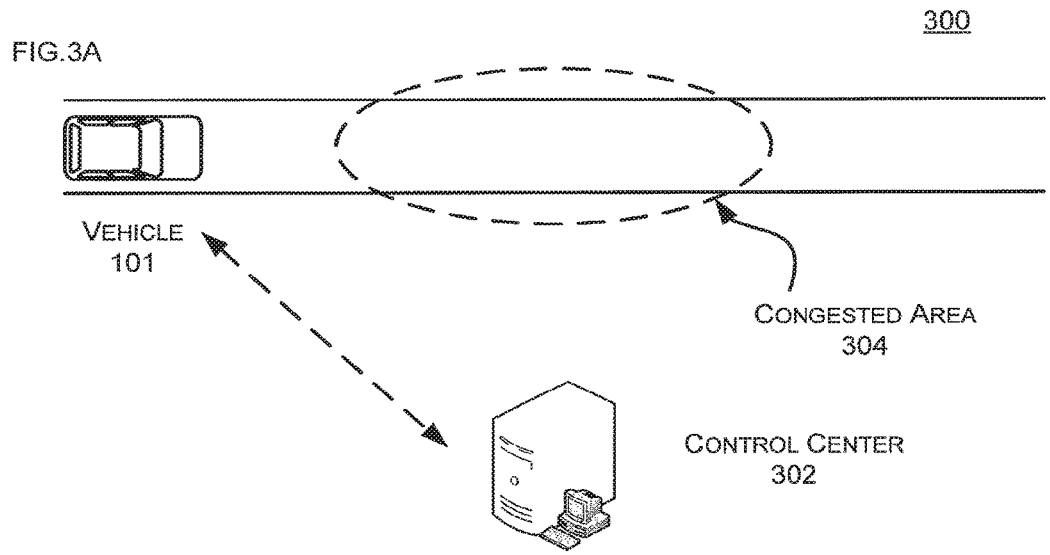
FIG. 3 shows a high-level diagram of another example scenario in which a remote driving assistance service system provides services to a vehicle.
Figure 3:
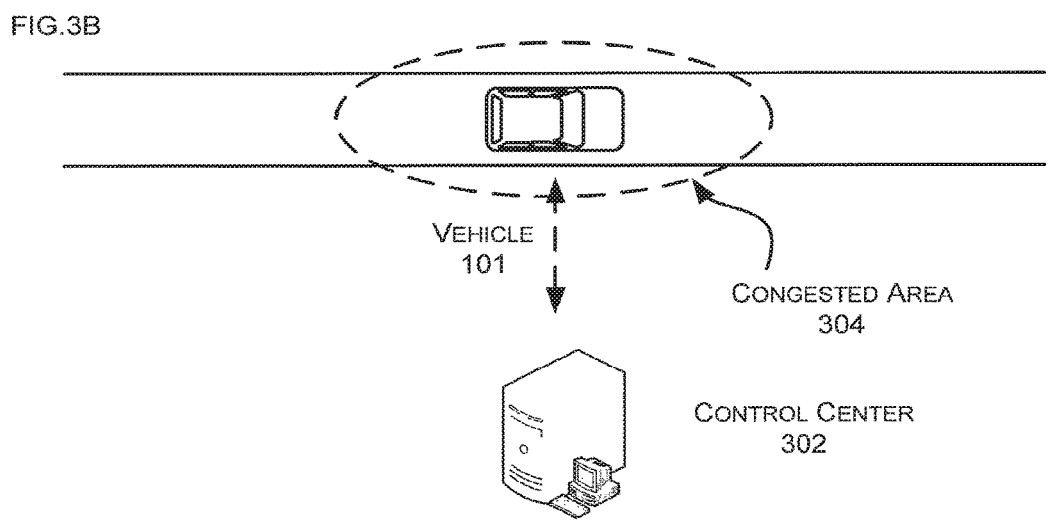
Figure 3:
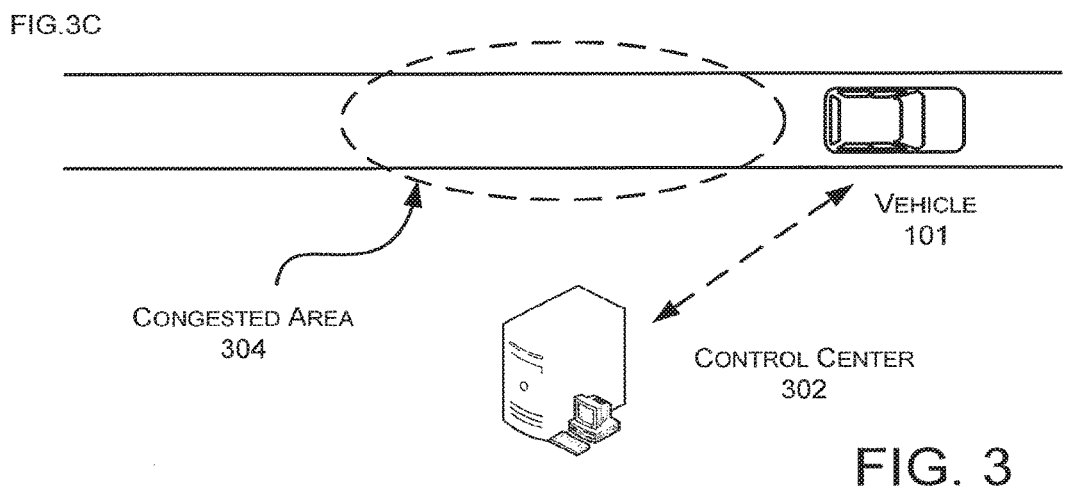

FIG. 3 shows a high-level diagram of another example scenario in which a remote driving assistance service system provides services to a vehicle, arranged in accordance with at least some embodiments described herein. As depicted, system 300 may include, at least, vehicle 101 and a control center 302. The example scenario may include a congested area 304 that may refer to an area in which traffic is identified or deemed to be congested by control center 302. FIG. 3 includes FIG. 3A, FIG. 3B, and FIG. 3C that respectively depict scenarios when vehicle 101 is approaching, driving through, and leaving congested area 304.

Control center 302 may refer to a computing device served and/or operated by a remote driving assistance service provider. Non-limiting examples of remote driving assistance service providers may be a municipal service, a subscription-based service, etc. Regardless of the type of the remote driving assistance service provider, control center 302 may be communicatively coupled to vehicle 101 via a communication network, e.g., the Internet, that follows at least one of communication protocols. The communication protocols may include any mobile communications technology, e.g., GSM, CDMA, etc., depending upon the technologies supported by particular wireless service providers. The one or more communication links may be implemented utilizing non-cellular technologies such as conventional analog AM or FM radio, Wi-Fi™, wireless local area network (WLAN or IEEE 802.11), WiMAX™, Bluetooth™, hard-wired connections, e.g., cable, phone lines, and other analog and digital wireless voice and data transmission technologies.

Control center 302 may be configured to receive environmental information collected by the sensors on vehicle 101, via the communication network. The environmental information may include, at least, distances between vehicle 101 and one or more surrounding objects, e.g., other vehicles; a speed of vehicle 101; ambient brightness; a position of vehicle 101; traffic signals; road conditions; etc. For example, location information of vehicle 101 may be collected by a global positioning system (GPS) device installed on vehicle 101 and transmitted to control center 302 periodically or in real time. Based on the received location information of vehicle 101, control center 302 may monitor a position of vehicle 101 relative to congested area 304.

Additionally, control center 302 may be configured to communicate with a database of a geographical information system, e.g., Google Maps®, so that control center 302 may receive or monitor real time traffic information to identify congested area 304. The real time traffic information may include one or more indicatives of average speeds of vehicles traveling on one or more streets or roads. For example, one of the indicatives may indicate that the vehicles on 7$^{th}$ avenue are traveling at 4 km/h. Based on the real time traffic information, control center 302 may identify congested area 304, e.g., ten blocks on 7$^{th}$ avenue.

Congested area 304 may refer to an area in which traffic is identified or deemed to be congested by control center 302 based on the real time traffic information received from the database of the geographical information system. Congested area 304 is illustrated in FIG. 3 and described hereafter as an example of an area where a predetermined number of vehicles 101 are detected to be traveling at a low speed over a predetermined amount of time; one skilled in the art will appreciate there will be other types of areas where vehicles travel at a low speed due to speed limitations or other factors, e.g., weather conditions, road construction, etc.

Control center 302 may determine, based on the location of congested area 304 and the location information of vehicle 101, that vehicle 101 is approaching congested area 304, within congested area 304, or leaving congested area 304.

FIG. 3A illustrates that control center 302 identifies congested area 304 and vehicle 101 is approaching congested area 304. Control center 302 may generate an announcement regarding the availability of the remote driving assistance service for subscribing vehicles. Control center 302 may further transmit the announcement to vehicle 101 via the aforementioned communication network. In such examples, control center 102 may encrypt the announcement so that only subscribing vehicles, with a decrypting receiver, may respond to the announcement.

Subsequent to the announcement regarding availability of the remote driving assistance service, one or more of vehicles 101 and control center 102 may engage in a security protocol. As a non-limiting example, the one or more of vehicles 101 may submit a verification request to verify the identity of control center 302. The verification request may be sent as a measure to prevent unauthorized parties from controlling vehicle 101. The verification request may include a message and a copy of the message that is encrypted with a private key. Control center 302 may decrypt the copy of the message from a respective one of vehicles 101 with a public key, which may be stored on a storage device associated with control center 302. Control center 302 may further compare the decrypted copy to the message included in the verification request. The result of the comparison may be transmitted back to vehicle 101 to determine if control center 302 is authorized to control vehicle 101.

If control center 302 is determined, by vehicle 101, as an authorized control center, vehicle 101 may submit a request for the remote driving assistance service to control center 302.

FIG. 3B illustrates that control center 304 controls vehicle 101 traveling through congested area 304. In response to the request for the remote driving assistance service, control center 302 may generate the remote driving commands for the respective vehicle 101 in accordance with the previously collected environmental information from sensors 210, and further, transmit the remote driving commands to vehicle 101.

For example, when the distance sensors on vehicle 101 indicate that a distance between vehicle 101 and another vehicle in front of vehicle 101 is less than a predetermined value set as a safe following distance, control center 302 may transmit a remote driving command to the respective vehicle 101 so that the processors on vehicle 101 may apply the brake to reduce the speed of vehicle 101.

FIG. 3C illustrates that control center 304 terminates the remote driving assistance service when vehicle 101 left congested area 304.

Based on the relative location of vehicle 101, control center 102 may cease transmitting the remote driving commands until conditions improve to a point where the vehicle may proceed at a safe or legal speed limit, at which time the remote driving assistance service instructs the driver to resume control of the vehicle. That is, when vehicle 101 is determined to be outside of congested area 108 or when a detected speed of vehicle 101 exceeds the predetermined threshold value that is indicative of congested traffic conditions, control center 102 may transmit instructions for the driver to resume control of vehicle 101. When the sensors on vehicle 101 indicate that the driver has actively resumed driving control of vehicle 101, the remote driving assistance service may be terminated by control center 102.

Figure 4:
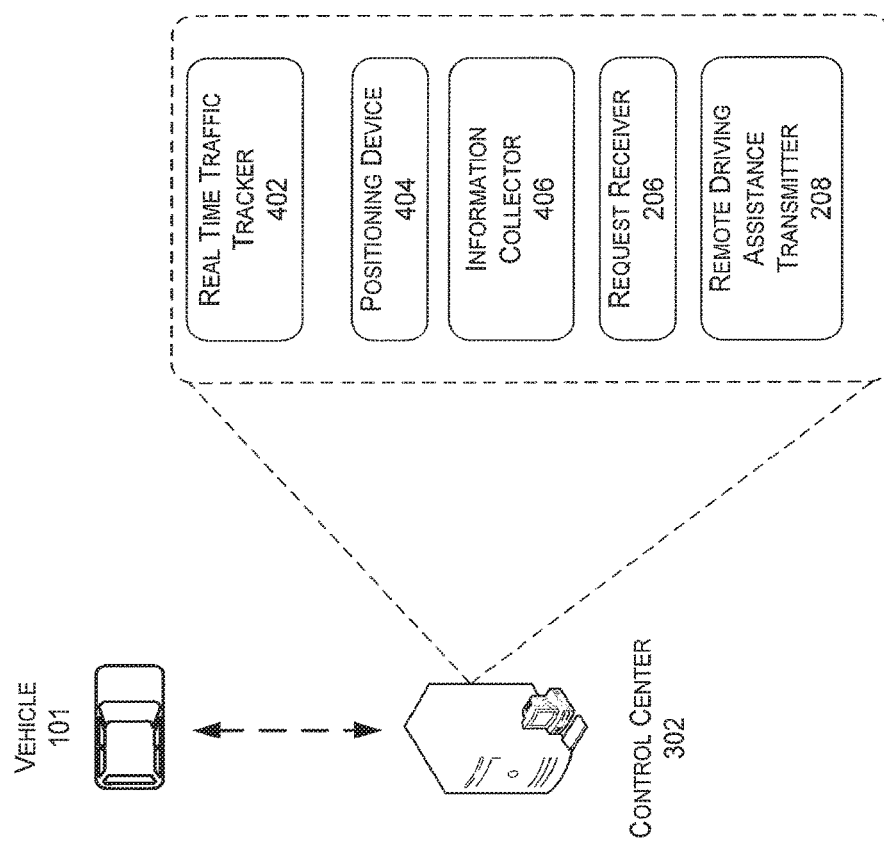
FIG. 4 shows another example control center by which various aspects of remote driving assistance may be implemented.

FIG. 4 shows another example control center 302 by which remote driving assistance may be implemented, arranged in accordance with at least some embodiments described herein. As depicted, control center 302 may include, at least, a real time traffic tracker 402, a positioning device 404, an information collector 406, request receiver 206, and remote driving assistance manager 208.

Real time traffic tracker 402 may refer to a component that may be configured to communicate with a database of a geographical information system, e.g., Google Maps®, to receive real time traffic information. The real time traffic information may include one or more indicatives of average speeds of vehicles traveling on one or more streets or roads. Based on the real time traffic information, real time traffic tracker 402 may identify congested area 304. In accordance with various embodiments, real time traffic tracker 402 may be implemented as hardware, software, firmware, or any combination thereof.

Positioning device 404 may refer to a component that may be configured to monitor location information of subscribing vehicles including vehicle 101. The location information of vehicle 101 may be collected by a GPS device installed on vehicle 101 and transmitted to positioning device 404 periodically or in real time. Based on the location information of vehicle 101 and the location of congested area 304, positioning device 404 may monitor a position of vehicle 101 relative to congested area 304, which may serve a basis for determining whether vehicle 101 is approaching congested area 304, within congested area 304, or left congested area 304. In accordance with various embodiments, positioning device 404 may be implemented as hardware, software, firmware, or any combination thereof.

Information collector 406 may refer to a component that may be configured to receive environmental information collected from sensors 210 associated with vehicle 101, traffic signals of congested area 304, and/or road conditions of congested area 304. The environmental information may include, at least, a distance between vehicle and a surrounding object, a speed of the vehicle, ambient brightness, etc. In accordance with various embodiments, information collector 406 may be implemented as hardware, software, firmware, or any combination thereof.

Request receiver 206 may refer to a component that may be configured to execute a security protocol with at least one of vehicles 101, via the aforementioned communication network. Request receiver 206 may receive, a verification request to verify the identity of control center 302 and/or a request for the remote driving assistance service from one of the subscribing vehicles, e.g., vehicle 101. In at least some examples, since the request for the remote driving assistance service may be encrypted by processors 212 on vehicle 101, request receiver 206 may decrypt the request prior to transmitting the request to remote driving assistance manager 208.

Remote driving assistance manager 208 may refer to a component that may be configured to generate remote driving commands and transmit the remote driving commands to vehicle 101. That is, in response to the request for the remote driving assistance service, remote driving assistance manager 208 may generate the remote driving commands in accordance with the environmental information collected by sensors 210 integrated with vehicle 101, road conditions of congested area 304, and/or traffic signals of congested area 304. For example, when the distance sensors on vehicle 101 indicate that a distance between vehicle 101 and another vehicle in front of vehicle 101 is less than a predetermined value and signals indicating such detection are transmitted to control center 302, remote driving assistance manager 208 may generate a command for vehicle 101 to brake. Remote driving assistance manager 208 may further transmit the command to brake to vehicle 101 so that the processors on vehicle 101 may apply the brakes or otherwise act to reduce the speed of vehicle 101. In another example when the sensors on vehicle 101 detect icy or other dangerous road conditions and signals indicating such detection are transmitted to control center 102, remote driving assistance manager 208 may generate a command for vehicle 101 to decelerate. Remote driving assistance manager 208 may transmit the command to decelerate to vehicle 101 so that processors 212 on vehicle 101 may control vehicle 101 to drive at a slower speed, e.g., 10 km/h that is appropriate for such road conditions. In yet another example, when an image sensor on vehicle 101 detects a red light, remote driving assistance manager 208 may generate a "stop" command so that processors 212 on vehicle 101 may control vehicle 101 to fully stop in front of the red light.

Remote driving assistance manager 208 may cease transmitting the remote driving commands when vehicle 101 is determined to have moved beyond boundaries of congested area 304. In some examples, remote driving assistance manager 208 may transmit instructions to the driver. When sensors 210 on vehicle 101 indicate that the driver has resumed driving control of vehicle 101 and signals indicating such detection are transmitted to control center 302, the remote driving assistance service may be terminated by remote driving assistance manager 208.

Figure 5:
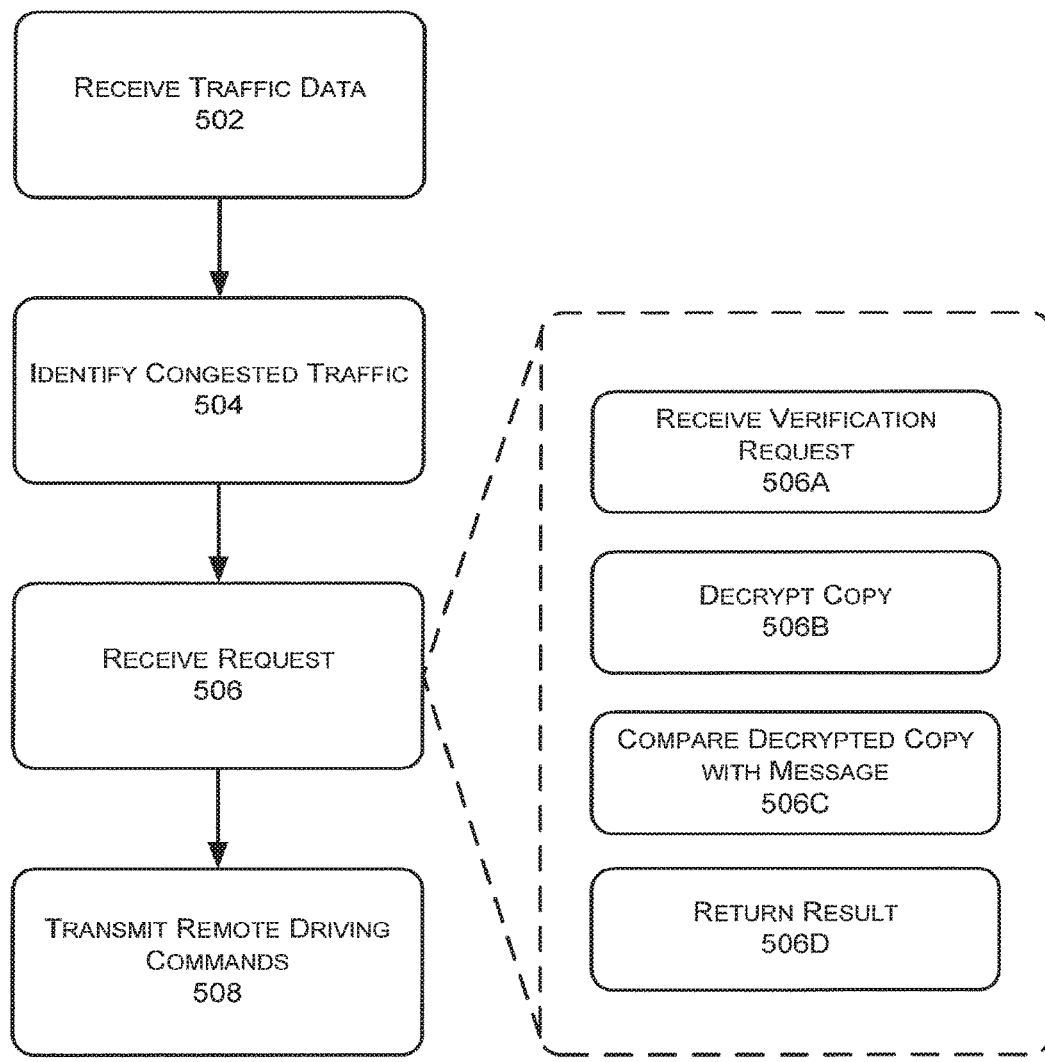
FIG. 5 shows an example configuration of a processing flow of operations by which remote driving assistance may be implemented.

FIG. 5 shows an example configuration of a processing flow 500 of operations by which remote driving assistance may be implemented, arranged in accordance with at least some embodiments described herein. As depicted, processing flow 500 may include sub-processes executed by various components that are part of example system 100. However, processing flow 500 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, and/or 508. Block 506 may include sub-blocks 506A, 506B, 506C, and/or 506D. Processing may begin at block 502.

Block 502 (Receive Traffic Data) may refer to traffic receiver 202 receiving traffic data and environment data from sensors 106. The traffic data may include information, collected by sensors 106, regarding traffic conditions within a predetermined location, e.g., intersections of roads, parking garage, etc. Non-limiting examples of the information collected by sensor 106 and received by traffic receiver 202 may include thermal images, picture images, speed, weights, etc. Traffic receiver 202 may transmit the received data to traffic evaluator 204 as a basis for identifying congested traffic. Block 502 may be followed by block 504.

Block 504 (Identify Congested Area) may refer to traffic evaluator 204 identifying congested traffic based at least on the traffic data received from traffic receiver 202.

For example, based on thermal images collected by sensors 106, traffic evaluator 204 may recognize vehicles on the thermal images and count the number of vehicles that appear in the thermal images within a predetermined span or length of a road or a street. When the number of vehicles exceeds a predetermined value number of vehicles deemed to indicate congested traffic, traffic evaluator 204 may deem or identify traffic to be congested within a portion of sensor range 110.

In another example, when the weight information received via traffic receiver 202 indicates the number of vehicles within a portion of sensor range 110 exceeds the predetermined value indicative of congested traffic based on a cumulative weight of vehicles within the predetermined span or length of a road or a street, at an intersection, etc., traffic evaluator 204 may deem or identify traffic to be congested within the portion of sensor range 110. In yet another example, when the detected speed of a predetermined number of vehicles 101 within sensor range 110 are less than a predetermined threshold speed value, e.g., 5 km/h, traffic evaluator 204 may deem or identify traffic to be congested within sensor range 110. Block 504 may be followed by block 506.

Block 506 (Receive Request) may refer to request receiver 206 receiving a verification request to verify the identity of control center 102 and/or a request for the remote driving assistance service from one of the subscribing vehicles, e.g., vehicle 101. Block 506 may include sub-blocks 506A, 506B, 506C, and/or 506D.

Sub-block 506A (Receive Verification Request) may refer to request receiver 206 receiving a verification request to verify the identity of control center 102 (or control center 302). The verification request may include a message and a copy of the message that is encrypted with a private key. The content of the message may be any type of combinations of letters, numbers, characters, symbols, etc., including randomly generated sequences of characters. Sub-block 506A may be followed by sub-block 506B.

Sub-block 506B (Decrypt Copy) may refer to request receiver 206 decrypting the copy of the message with a public key. The public key may be stored on a storage device associated with control center 102 (or control center 302). Sub-block 506B may be followed by sub-block 506C.

Sub-block 506C (Compare Decrypted Copy with Message) may refer to request receiver 206 comparing the decrypted copy of the message to the message. The result of the comparison may indicate if the decrypted copy of the message is same as the message. Sub-block 506C may be followed by sub-block 506D.

Sub-block 506D (Return Result) may refer to request receiver 206 returning the result of the comparison to a respective one of vehicles 101. If the result indicates that the decrypted copy of the message is same as the message, control center 102 may be deemed as an authorized control center by vehicle 101. Sub-block 506D may be followed by block 508.

Block 508 (Transmit Remote Driving Commands) may refer to remote driving assistance manager 208 generating remote driving commands and transmitting the remote driving commands to vehicle 101. That is, in response to the request for the remote driving assistance service from traffic receiver 202 and traffic conditions from traffic evaluator 204, remote driving assistance manager 208 may generate the remote driving commands. For example, when the distance sensors on vehicle 101 indicate that a distance between vehicle 101 and another vehicle in front of vehicle 101 is less than a predetermined value and signals indicating such detection are transmitted to control center 102, remote driving assistance manager 208 may generate command for vehicle 101 to brake. Remote driving assistance manager 208 may further transmit the command to brake to vehicle 101 so that processors 212 on vehicle 101 may apply the brake or otherwise act to reduce the speed of vehicle 101 to a predetermined speed. In another example when the sensors on vehicle 101 detect icy or other dangerous road conditions and signals indicating such detection are transmitted to control center 102, remote driving assistance manager 208 may generate a command for vehicle 101 to decelerate. Remote driving assistance manager 208 may transmit the command to decelerate to vehicle 101 so that processors 212 on vehicle 101 may control vehicle 101 to drive at a slower speed, e.g., 10 km/h that is appropriate for the detected road conditions. In yet another example, when an image sensor on vehicle 101 detects a red light and signals indicating such detection are transmitted to control center 102, remote driving assistance manager 208 may generate a "stop" command so that processors 212 on vehicle 101 may control vehicle 101 to fully stop in front of the red light.

Additionally, remote driving assistance manager 208 may determine a location of a respective one of vehicles 101 relative to congested area 108 based on the position information collected by the positioning device on vehicle 101. Based on the relative location of vehicle 101, remote driving assistance manager 208 may further determine whether vehicle 101 has moved beyond congested area 108. Remote driving assistance manager 208 may cease transmitting the remote driving commands when vehicle 101 is determined to have moved beyond boundaries of congest area 108. In some examples, remote driving assistance manager 208 may transmit instructions to the driver. When sensors 210 on vehicle 101 indicate that the driver starts to control vehicle 101, the remote driving assistance service may be terminated by remote driving assistance manager 208.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
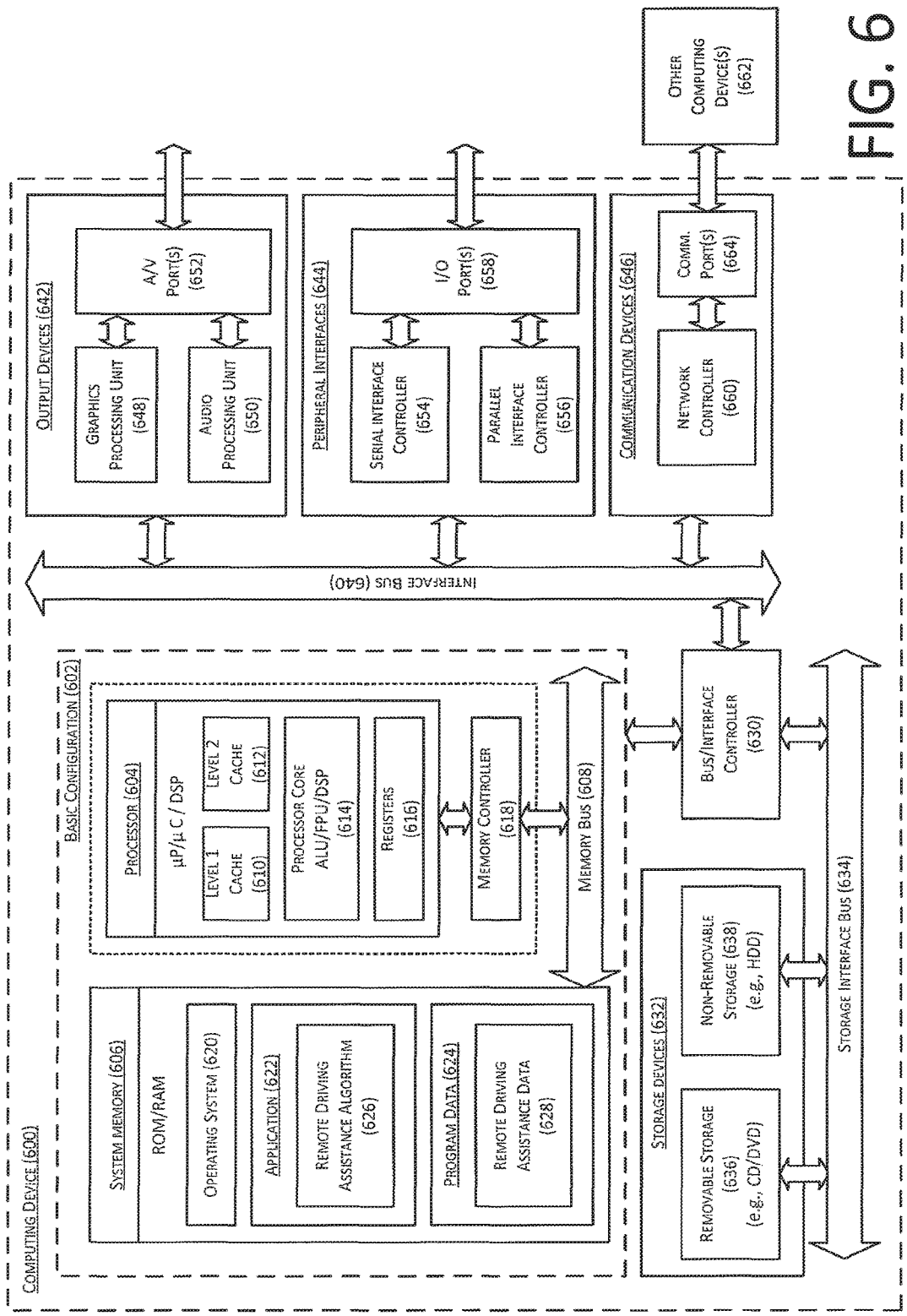
FIG. 6 shows a block diagram illustrating an example computing device that is arranged for remote driving assistance, all arranged in accordance with at least some embodiments described herein.

FIG. 6 shows a block diagram illustrating an example computing device that is arranged for remote driving assistance, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a remote driving assistance algorithm 626 that is arranged to perform the functions as described herein including those described with respect to process 500 of FIG. 5. Program data 624 may include remote driving assistance data 628 that may be useful for operation with remote driving assistance algorithm 626 as is described herein. In some embodiments, application 622 may be arranged to operate with program data 624 on operating system 620 such that implementations of remote driving assistance may be provided as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or speed; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system to control a vehicle, the system comprising:
   a control center that comprises:
   a request receiver configured to:
   receive a verification request, from a requesting vehicle of at least some vehicles, to verify that the control center is an authorized control center, wherein the verification request includes a message and a copy of the message encrypted with a private key, and wherein the message includes a request for a remote driving assistance service from the requesting vehicle;
   decrypt the copy of the message with a public key;
   compare the decrypted copy of the message with the message;
   return a result of the comparison to the requesting vehicle, wherein the result indicates that the decrypted copy of the message is same as the message; and
   verify that the control center is the authorized control center based on the result; and
   a remote driving assistance manager configured to:
   in response to the verification of the control center, control the requesting vehicle, in place of a driver of the requesting vehicle, until the remote driving assistance service determines that either the requesting vehicle is outside an area of congested traffic or a speed of the requesting vehicle exceeds a specific threshold value;
   in response to the determination that either the requesting vehicle is outside the area of congested traffic or the speed of the requesting vehicle exceeds the specific threshold value, transmit instructions to the driver to resume control of the requesting vehicle; and
   in response to a determination that the driver has not resumed control of the requesting vehicle, guide the requesting vehicle to a safe location.

2. The system of claim 1, wherein to control the requesting vehicle, the remote driving assistance manager is configured to transmit remote driving commands to the requesting vehicle.

3. The system of claim 2, wherein the remote driving assistance manager is further configured to cease the transmission of the remote driving commands by initial transmission of a warning indicator.

4. The system of claim 3, wherein the remote driving assistance manager is configured to cease the transmission of the remote driving commands based on a determination that the driver has resumed the control of the requesting vehicle.

5. The system of claim 2, wherein the remote driving assistance manager is further configured to guide the requesting vehicle to the safe location by transmission of the remote driving commands.

6. The system of claim 1, wherein the remote driving assistance manager is further configured to determine a location of the requesting vehicle relative to the area of congested traffic.

7. The system of claim 6, wherein the location of the requesting vehicle is generated by a global positioning system (GPS) device associated with the requesting vehicle.

8. The system of claim 1, wherein the request receiver is further configured to receive environmental information collected from one or more sensors associated with the requesting vehicle, and
   wherein the environmental information includes a distance between the requesting vehicle and a surrounding object, the speed of the requesting vehicle, ambient brightness, traffic signals of the area of congested traffic, or road conditions of the area of congested traffic.

9. The system of claim 1, wherein the message includes at least a combination of one or more of: letters, numbers, characters, symbols, and randomly generated sequence of characters.

10. The system of claim 1, wherein the control center is configured to communicate with a database of a geographical information system to receive or monitor real time traffic information, and wherein the real time traffic information is used to identify the area of congested traffic.

11. A method performed under control of a control center to control vehicles remotely, the method comprising:
    receiving, by a request receiver comprised in the control center, a verification request, from a vehicle of at least some vehicles, to verify that the control center is an authorized control center, wherein the verification request includes a message and a copy of the message encrypted with a private key, and wherein the message includes a request for a remote driving assistance service from the vehicle;
    decrypting the copy of the message with a public key;
    comparing the decrypted copy of the message with the message;

returning a result of the comparison to the vehicle, wherein the result indicates that the decrypted copy of the message is same as the message;

verifying that the control center is the authorized control center based on the result;

in response to the verification of the control center, controlling the vehicle, by a remote driving assistance manager comprised in the control center, in place of a driver of the vehicle, until the remote driving assistance service determines that either the vehicle is outside an area of congested traffic or a speed of the vehicle exceeds a specific threshold value;

in response to the determination that either the vehicle is outside the area of congested traffic or the speed of the vehicle exceeds the specific threshold value, transmitting instructions to the driver to resume control of the vehicle; and in response to a determination that the driver has not resumed control of the vehicle, guiding the vehicle to a safe location.

12. The method of claim 11, wherein the at least some vehicles comprise one or more vehicles that have a subscription to the remote driving assistance service.

13. The method of claim 11, wherein the at least some vehicles comprise all vehicles that are capable of being remotely driven within at least a specific range of a sensor.

14. The method of claim 11, further comprising transmitting remote driving commands to the vehicle.

15. The method of claim 11, further comprising ceasing control of the vehicle after transmission of a warning message.

16. The method of claim 11, wherein the message includes at least a combination of one or more of: letters, numbers, characters, symbols, and randomly generated sequence of characters.

17. A non-transitory computer-readable medium that stores executable instructions that, in response to execution, cause one or more processors of a control center to perform or control performance of operations to:

identify a verification request, from a requesting vehicle of at least some vehicles, to verify that the control center is an authorized control center, wherein the verification request includes a message and a copy of the message encrypted with a private key, and wherein the message includes a request for a remote driving assistance service from the requesting vehicle;

decrypt the copy of the message with a public key;

compare the decrypted copy of the message with the message;

return a result of the comparison to the requesting vehicle, wherein the result indicates that the decrypted copy of the message is same as the message;

verify that the control center is the authorized control center based on the result;

in response to the verification of the control center, control the requesting vehicle, in place of a driver of the requesting vehicle, until the remote driving assistance service determines that either the requesting vehicle is outside an area of congested traffic or a speed of the requesting vehicle exceeds a specific threshold value;

in response to the determination that either the requesting vehicle is outside the area of congested traffic or the speed of the requesting vehicle exceeds the specific threshold value, transmit instructions to the driver to resume control the requesting vehicle; and in response to a determination that the driver has not resumed control of the requesting vehicle, guide the requesting vehicle to a safe location.

18. The non-transitory computer-readable medium of claim 17, wherein the at least some vehicles comprise one or more vehicles that have a subscription to the remote driving assistance service.

19. The non-transitory computer-readable medium of claim 17, wherein the at least some vehicles comprise all vehicles that are capable of being remotely driven within at least a specific range of a sensor.

20. The non-transitory computer-readable medium of claim 17, wherein the message includes at least a combination of one or more of: letters, numbers, characters, symbols, and randomly generated sequence of characters.

* * * * *